United States Patent [19]

Matsui

[11] Patent Number: 5,751,681
[45] Date of Patent: May 12, 1998

[54] TRACKING SIGNAL DETECTION WITH A PHOTODETECTOR RECEIVING ONE OF A ∓1ST-ORDER POLARIZED LIGHT

[75] Inventor: Tsutomu Matsui, Tokyo, Japan

[73] Assignee: NEC Corporation, Tokyo, Japan

[21] Appl. No.: 819,140

[22] Filed: Mar. 17, 1997

[51] Int. Cl.⁶ ................................................. G11B 7/00
[52] U.S. Cl. .................. 369/112; 369/44.12; 369/44.23; 369/109; 369/110; 369/44.41
[58] Field of Search ........................ 369/44.12, 44.11, 369/44.42, 44.41, 44.23, 44.25, 109, 112, 110, 120, 103, 122, 44.14

[56] References Cited

U.S. PATENT DOCUMENTS

| | | | |
|---|---|---|---|
| 5,113,386 | 5/1992 | Whitehead et al. | 369/44.41 |
| 5,243,583 | 9/1993 | Ohuchida et al. | 369/44.12 |
| 5,257,131 | 10/1993 | Yoshida et al. | 369/109 |
| 5,315,574 | 5/1994 | Saimi | 369/109 |
| 5,579,291 | 11/1997 | Matsumoto | 369/44.25 |

FOREIGN PATENT DOCUMENTS

| | | |
|---|---|---|
| 1144233 | 6/1989 | Japan . |
| 4295629 | 10/1992 | Japan . |
| 6203420 | 7/1994 | Japan . |
| 6282858 | 10/1994 | Japan . |
| 798896 | 4/1995 | Japan . |
| 8227527 | 9/1996 | Japan . |

*Primary Examiner*—Tod R. Swann
*Assistant Examiner*—Kim-Kwok Chu
*Attorney, Agent, or Firm*—Whitham, Curtis & Whitham

[57] ABSTRACT

An optical head apparatus for a phase change disk includes a semiconductor laser, a rectangular prism, diffraction gratings, an optical sensor element, and a four-divisional optical sensor. The semiconductor laser outputs a laser beam. The rectangular prism has an inclined surface formed with a polarizing beam splitter film, and deflects the laser beam emitted from the semiconductor laser by 90° toward an optical disk. The polarizing beam splitter passes a return beam of the laser beam which is reflected by the optical disk. The diffraction gratings are arranged in contact with or close to the inclined surface of the prism, and generate a 0th-order polarized laser beam and ±1st-order polarized laser beams from the beam returning from the optical disk through the rectangular prism. The optical sensor element detects the 0th-order polarized laser beam output from the diffraction gratings. A reproducing signal is obtained from an output from the optical sensor element. The four-divisional optical sensor detects one of the ±1st-order polarized laser beams output from the diffraction gratings. A focusing error signal and a tracking error signal are obtained based on an output from the four-divisional optical sensor.

7 Claims, 6 Drawing Sheets

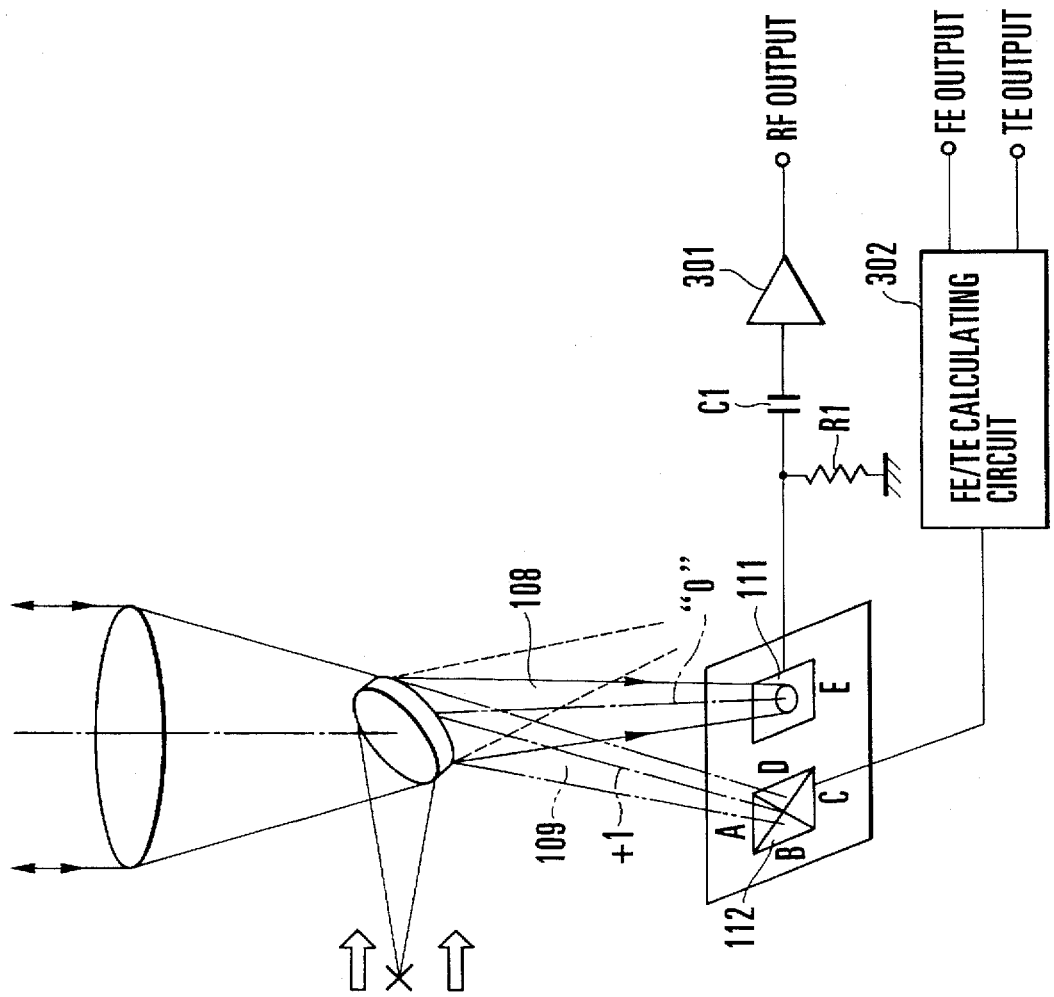

TRACKING SIGNAL DETECTION WITH A PHOTODETECTOR RECEIVING ONE OF A ∓1ST-ORDER POLARIZED LIGHT

BACKGROUND OF THE INVENTION

The present invention relates to a phase change optical head apparatus for performing recording, reproducing, and erasing and, more particularly, to a phase change optical head apparatus whose appearance is compact and whose weighting is light.

Studies on an external storage unit having both the high-speed accessibility of a magnetic disk for a computer and the large capacity memory for an optical disk are progressing in rapid speed. It is certain that an optical disk unit will be the next-generation disk unit because it has a high transfer rate, a high random access speed, and a large capacity memory, and because the medium can be stored well and have good durability due to a noncontact recording and reproducing.

Among conventional optical disk units, a phase change recording medium is promising as a next-generation erasable magneto-optical recording medium. Prior art techniques concerning a phase change optical head are disclosed in, e.g., Japanese Patent Laid-Open Nos. 1-144233 and 4-295629, and the like. Japanese Patent Laid-Open No. 1-144233 proposes an optical head device which is made compact and low cost and focuses a laser beam on a disk formation layer with a focusing optical system through a beam splitter, thereby recording/reproducing information. The proposed optical head device has a reflection type grating element and two separated detection systems. The reflection type grating element comprises a plurality of regions having two different characteristics by which a beam reflected by a disk and obtained by reflecting and diffracting a specific polarized beam and extracting it by a beam splitter to an off-axis position of the optical axis of a focusing optical system is split into a reflected beam and a diffracted beam. The first detection system detects a read signal from the reflected beam reflected by the reflection type grating element. The second detection system detects a focusing error signal and a tracking error signal from the diffracted beam.

Japanese Patent Laid-Open No. 4-295629 proposes an optical pickup apparatus capable of detecting a focusing error signal and an RF signal without increasing the number of semiconductor laser chips, thereby realizing the optical head apparatus having a smaller size and a lower price. The proposed optical pickup apparatus has two semiconductor lasers, two photodetectors, and a comparator for generating the focusing error signal.

The two photodetectors are arranged behind the semiconductor laser array and receive back light components of the laser beams, respectively.

FIG. 5 shows an example of the arrangement of a conventional phase change optical head. Referring to FIG. 5, a beam emitted from a laser 501 is collimated by a collimator lens 502, and sequentially passes through a wedge prism portion 503, a polarizing beam splitter 504, a 45° mirror portion 505, and a λ/4 plate 506. These optical parts are constituted as a composite prism 507. The wedge prism portion 503 converts an elliptic collimated beam to a beam having an almost circular shape. The polarizing beam splitter 504 and the λ/4 plate 506 constitute an optical isolator. The beam emitted from the composite prism 507 is focused on a phase change disk 509 by an objective lens 508.

A reflected beam from the phase change disk 509 is returned to the polarizing beam splitter 504 in a reverse path, and converted to an incident beam of an S-polarized. The beam splitter changes the optical path by 90°. The 90°-deflected beam is reflected again by 90° with a 45° mirror 510, and is received by a four-divisional optical sensor 514 through a convex lens 511, a concave lens 512, and a cylindrical lens 513.

When the optical sensor elements of the four-divisional optical sensor 514 are defined as P, Q, R, and S, as shown in FIG. 5, a focusing error signal is detected in accordance with the astigmatic method, and a tracking error signal is detected in accordance with the push-pull method. A reproducing RF signal is obtained by adding the outputs from the respective optical sensor elements.

FIG. 6 shows an example of a circuit arrangement that detects the RF signal, the focusing error signal, and a tracking error signal. Referring to FIG. 6, outputs (electrical signals obtained by photoelectric conversion) from the optical sensor elements P, Q, R, and S comprising photodiodes 601 are input to the inverting input terminals of differential amplifiers 603 to 606 through resistors R1, R2, R3, and R4, respectively. Outputs from the differential amplifiers 603 to 606 are input to differential amplifiers 607 and 608 through arithmetic operational portions constituting adders with resistance division, thereby obtaining a focusing error signal (FE) and a tracking error signal (TE) respectively expressed by equations (1) and (2) as outputs from the differential amplifiers 607 and 608:

$$FE=(P+R)-(Q+S) \quad (1)$$

$$TE=(Q+R)-(P+S) \quad (2)$$

Regarding the reproducing (RF) signal, DC components of each optical element outputs (P, Q, R, and S) are removed by capacitors C, and the remaining higher frequency components are added. The obtained sum is output from an amplifier 602. This relationship is expressed by equation (3):

$$RF=P+Q+R+S \quad (3)$$

In the conventional phase change optical head described above, a focusing error signal and an RF signal are detected from the same optical sensor outputs. The RF signal is obtained by removing DC components with the capacitors. Therefore, resistance noise of $\sqrt{4kTBR}$ where k is the Boltzmann's constant ($1.38 \times 10^{-38}$ W·S·K$^{-1}$), T is the absolute temperature, and B is the band of the amplifier is generated due to a resistance R during current-voltage conversion performed by the optical sensor for the purpose of focusing error detection, and an RF signal having a high S/N (signal-to-noise) ratio cannot be obtained.

In the circuit shown in FIG. 6, since non-resistance noise of $4\sqrt{4kTBR}$ is generated where R is the sum resistance of the resistors R1, R2, R3, and R4, a high CNR (Carrier-to-Noise Ratio) cannot be obtained. In addition, since the optical head having the conventional arrangement shown in FIGS. 5 and 6 has a large size and is heavy, it is difficult to make compact, to decrease the weight, and to improve the performance of the entire optical head.

SUMMARY OF THE INVENTION

It is an object of the present invention to provide an optical head capable of detecting a servo signal and an RF signal well.

It is another object of the present invention to provide a compact, lightweight optical head.

In order to achieve the above objects, according to the present invention, there is provided an optical head apparatus for a phase change disk, comprising a semiconductor laser for outputting a laser beam, a rectangular prism having an inclined surface with a polarizing beam splitter to deflect the laser beam emitted from the semiconductor laser by 90° toward an optical disk, the polarizing beam splitter passing therethrough a return beam of the laser beam which is reflected by the optical disk, diffracted light component generating means, arranged in contact with or close to the inclined surface of the prism, for generating a 0th-order polarized laser beam and ±1st-order polarized laser beams from the beam returning from the optical disk through the rectangular prism, a first optical sensor for detecting the 0th-order polarized laser beam output from the diffracted light component generating means, a reproducing signal being obtained from an output from the first optical sensor, and a second optical sensor for detecting one of the ±1st-order polarized laser beams output from the diffracted light component generating means, a focusing error signal and a tracking error signal being obtained based on an output from the second optical sensor.

BRIEF DESCRIPTION OF THE DRAWINGS

FIG. 3 is a schematic perspective view for explaining signal detection with the head shown in FIG. 1;

DESCRIPTION OF THE PREFERRED EMBODIMENT

The present invention will be described in detail with reference to the accompanying drawings.

Figure 1:
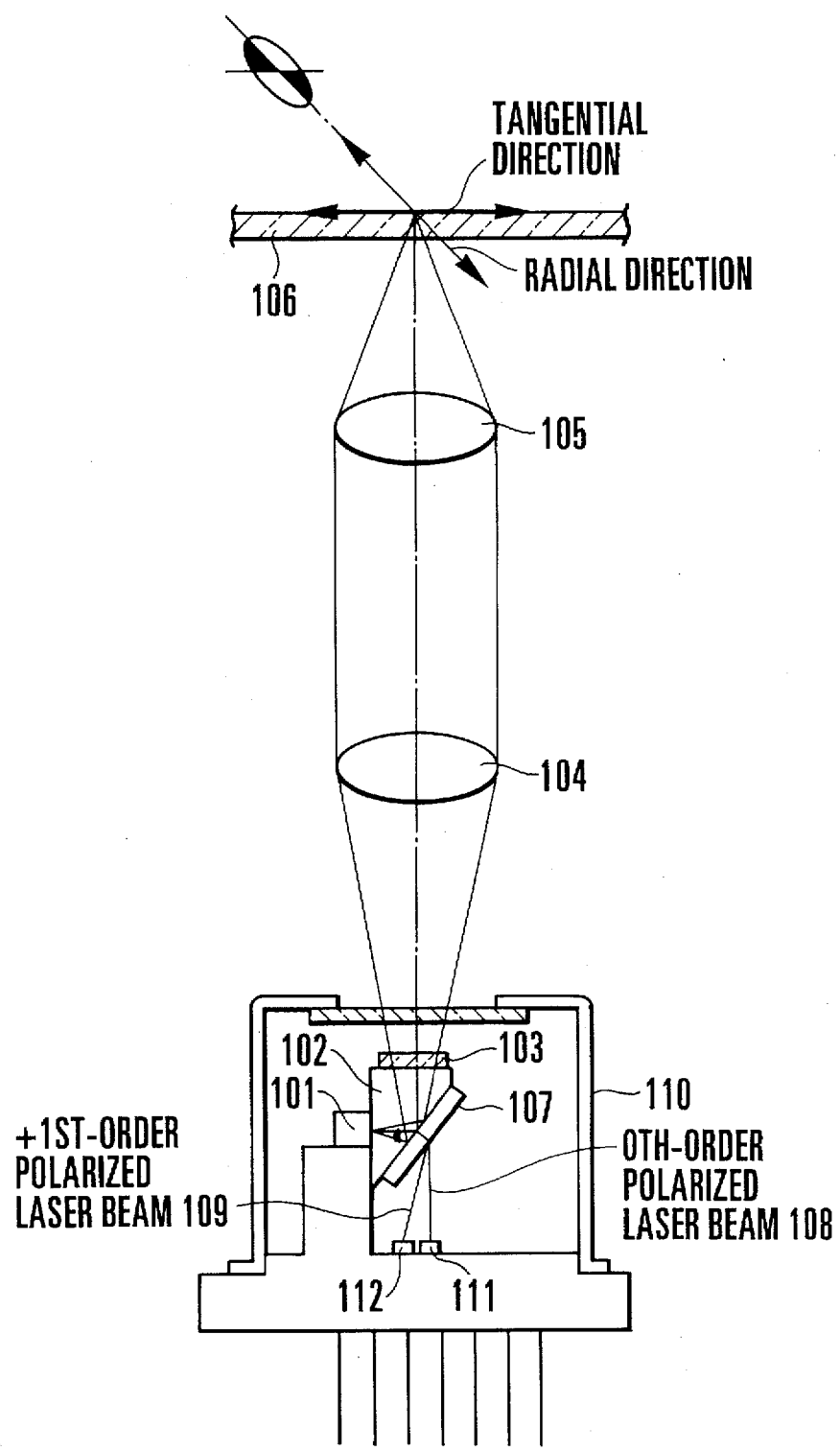
FIG. 1 is a schematic view showing the arrangement of a phase change optical head apparatus according to an embodiment of the present invention.

FIG. 1 shows the schematic arrangement of a phase change optical head apparatus according to an embodiment of the present invention. Referring to FIG. 1, a rectangular prism 102 is arranged in contact with the emissive surface of a semiconductor laser 101. An emitting beam from the semiconductor laser 101 is deflected by 90° with the rectangular prism 102 and becomes incident on a collimator lens 104 through a λ/4 plate 103 adhered to the rectangular prism 102. The beam is collimated into a collimated beam with the collimator lens 104 and is focused on a disk 106 by an objective lens 105. The beam emerging from the λ/4 plate 103 is circularly polarized, as shown in FIG. 1.

A flat plate 107 is adhered to the inclined surface of the rectangular prism 102. The flat plate 107 is preferably made of optical glass. A diffraction grating film or a hologram element film is formed on one surface of the flat plate 107, as will be described later.

The beam reflected by the disk 106 is returned to the rectangular prism 102 through the objective lens 105, the collimator lens 104, and the λ/4 plate 103, and is optically detected through the flat plate 107. An optical sensor element 111 detects an RF signal based on a 0th-order polarized laser beam 108 emerging from the diffraction grating formed on the surface of the flat plate 107. A four-divisional optical sensor 112 detects a focusing error signal and a tracking error signal based on a 1st-order polarized laser beam 109 emerging from the diffraction grating.

Figure 5:
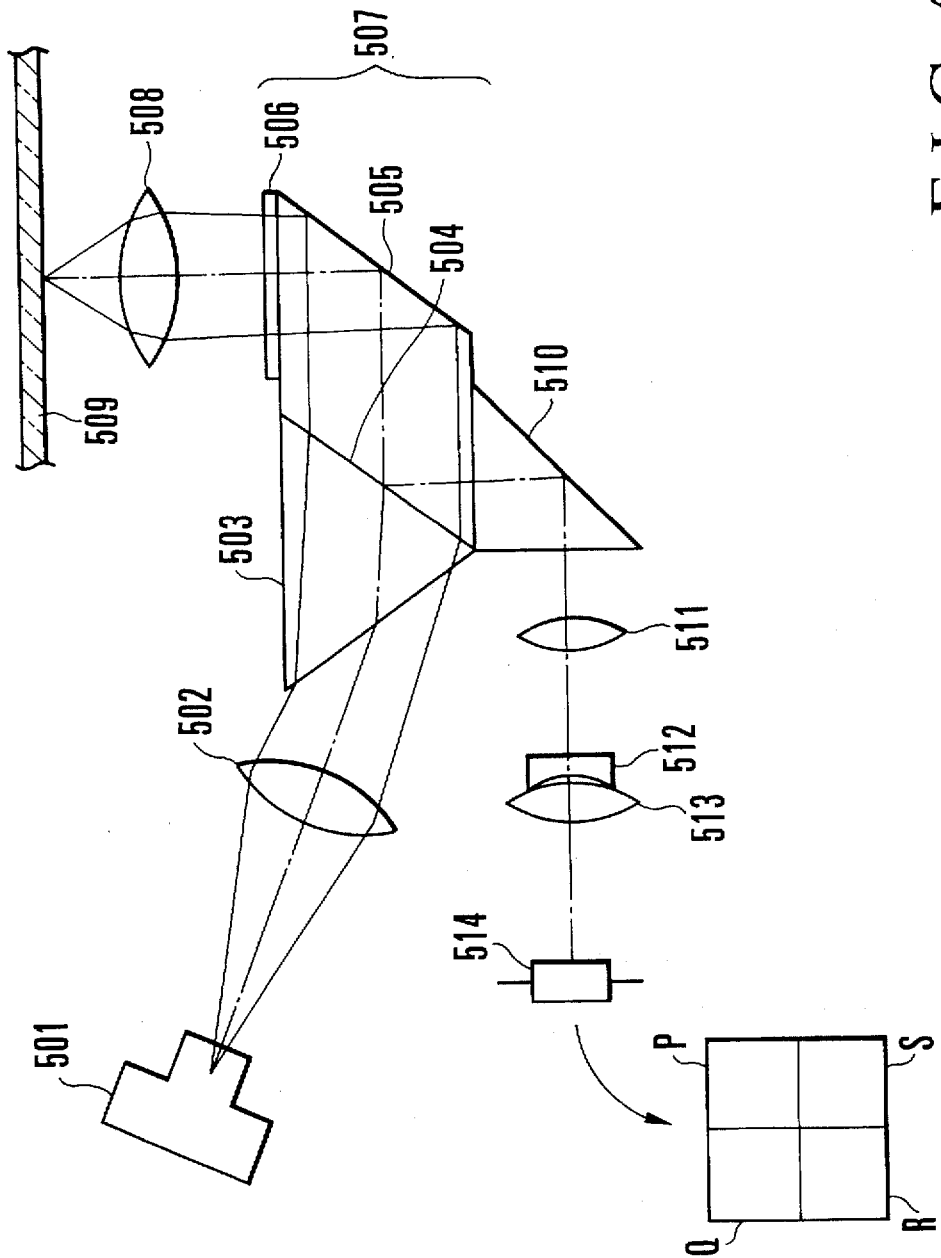
FIG. 5 is a view showing the arrangement of the optical system of a conventional optical head.

In this embodiment, the rectangular prism 102, the optical sensor element 111 for RF signal detection, the four-divisional optical sensor 112 for focusing error signal detection and tracking error signal detection, and a head amplifier (not shown) are incorporated in a capsulation 110 for laser emission, so that the optical head apparatus of this embodiment is greatly decreased in size when compared to the conventional optical system shown in FIG. 5.

Figure 2A:
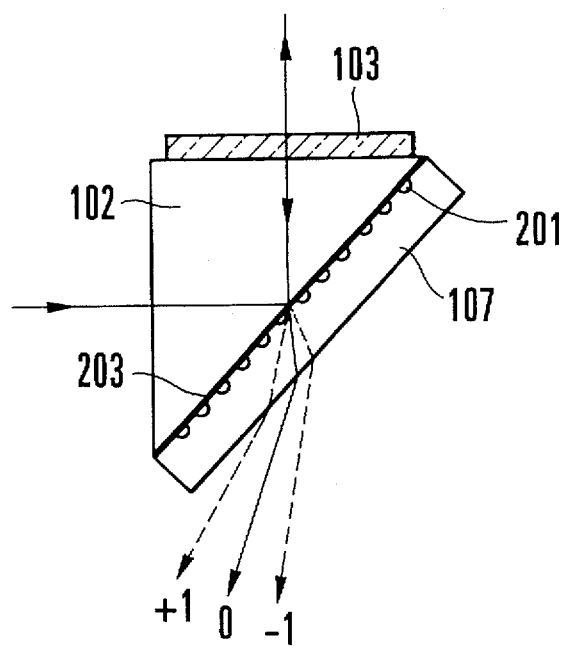
FIGS. 2A and 2B are schematic views showing examples of a rectangular prism shown in FIG. 1.

FIG. 2A shows an example of the rectangular prism 102 and the flat plate 107, and the path of the laser beam. Referring to FIG. 2A, the focused beam is returned to the inclined surface of the rectangular prism 102 and passes through the flat plate 107 arranged in contact with this inclined surface, thus generating an astigmatic difference. A focusing error signal is detected in accordance with the astigmatic method. A diffraction grating 201 or a hologram is formed on a surface of the flat plate 107 which is adhered to the rectangular prism 102.

A polarizing beam splitter film 203 is formed on the surface of the flat plate 107 which is adhered to the rectangular prism 102. The polarizing beam splitter film 203 is formed by stacking, e.g., a plurality of silicon oxide layers and cerium oxide or tellurium oxide layers. With this arrangement, the beam returning from the disk 106 becomes a P-polarized wave with respect to the polarizing beam splitter film 203 and thus will not return to the semiconductor laser 101. More specifically, the polarizing beam splitter film 203 rotates the plane of polarization of the beam returning from the disk 106 by 90°. The beam that has passed through the polarizing beam splitter film 203 passes through the flat plate 107 on which the diffraction grating 201 is formed on a surface thereof adhered with the inclined surface of the rectangular prism 102, and is output in the form of a 0th-order polarized laser beam and ±1st-order polarized laser beams.

Figure 2B:
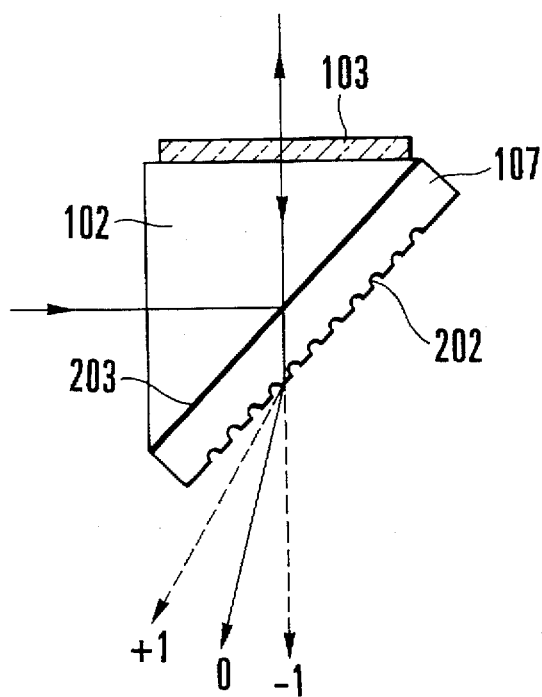

FIG. 2B shows an example in which a diffraction grating 202 or a hologram is formed on a surface of the flat plate 107 on which a rectangular prism 102 is not adhered.

FIG. 3 schematically shows the focused beam of this optical path. Referring to FIG. 3, the optical sensor element 111 for RF signal detection is arranged for the 0th-order polarized laser beam 108 which travels straight, and the four-divisional optical sensor (A, B, C, and D) 112 is arranged for the +1st-order polarized laser beam 109. With this arrangement, signals expressed by equations (4) to (6) are detected:

$$\text{focusing error signal} = (A+B)-(B+D) \quad (4)$$

$$\text{tracking error signal} = B-D \quad (5)$$

$$\text{RF signal} = E \quad (6)$$

Referring to FIG. 3, an electrical signal output (current output) from the optical sensor element 111 that receives the 0th-order polarized laser beam 108 is converted into a voltage signal with a resistor R1. A DC component is removed from the voltage signal through a coupling capacitor C1. The resultant signal is subjected to predetermined gain amplification with an amplifier 301, thereby obtaining the RF signal as an RF output.

Figure 6:
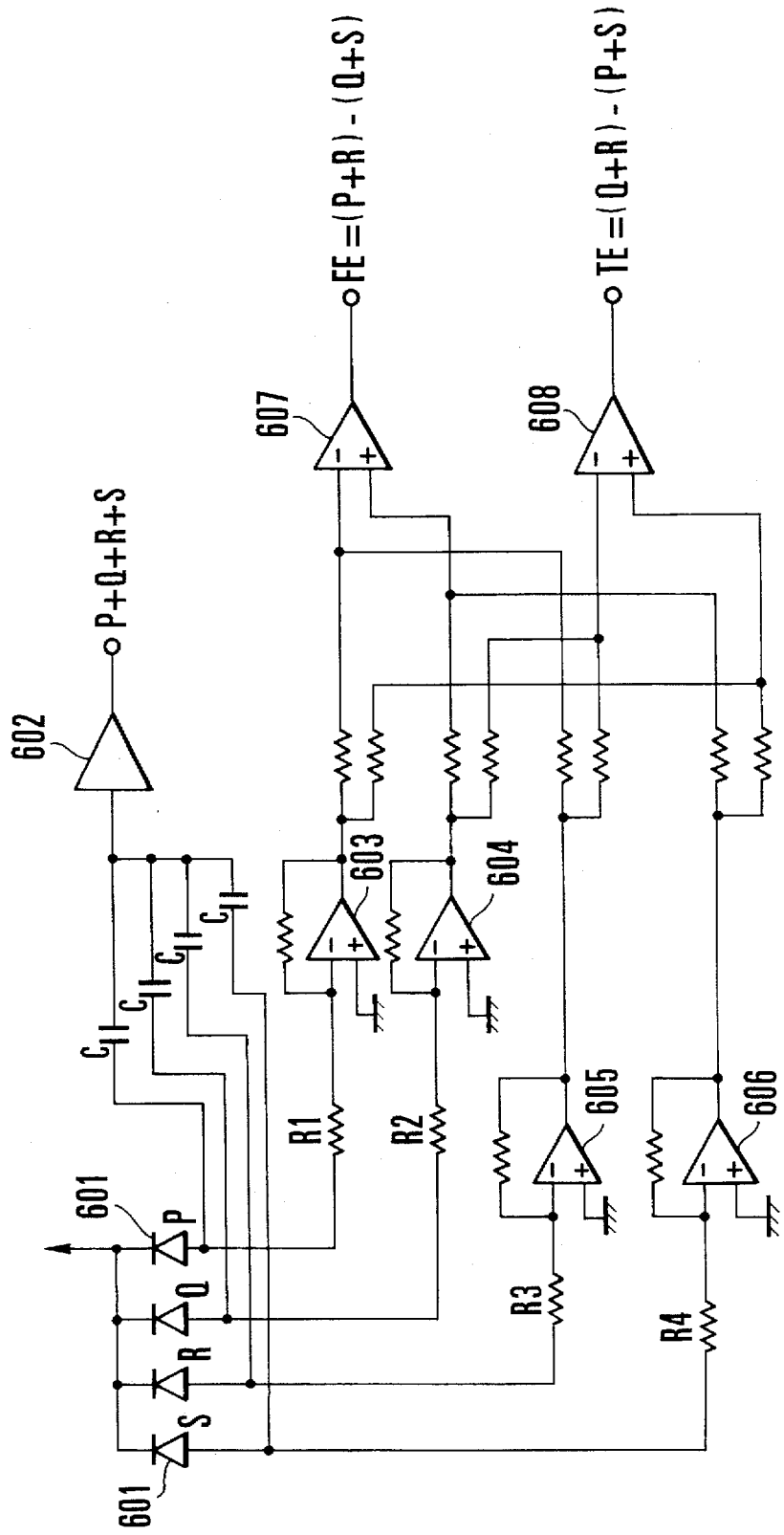
FIG. 6 is a circuit diagram showing the detection circuit of the conventional optical head that detects a servo signal and an RF signal.

The focusing error signal and the tracking error signal expressed by equations (4) and (5) are obtained with an FE/TE calculating circuit 302 from the electrical signal output from the four-divisional optical sensor 112 that receives the +1st-order polarized laser beam 109. The FE/TE calculating circuit 302 can be formed with adders and subtracters comprising the differential amplifiers 603 to 608 and the resistor group shown in FIG. 6. FE/TE calculation may also be performed by using a +1st-order polarized laser beam.

Figure 4A:
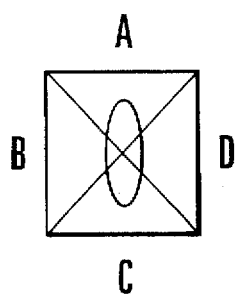
FIGS. 4A, 4B, and 4C are views showing servo signal detection with the head shown in FIG. 1.
Figure 4B:
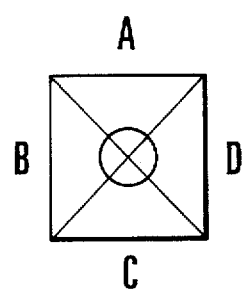
Figure 4C:
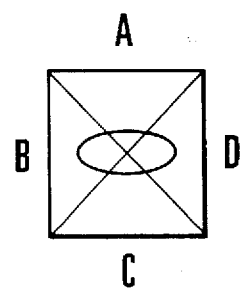

FIGS. 4A to 4C show the +1st-order polarized laser beam focused on the four-divisional optical sensor 112 during focusing error signal detection. When the disk 106 becomes far, the beam is focused to form an elliptic spot elongated in the A–C direction, as shown in FIG. 4A. When the disk 106 becomes near, the beam is focused to form an elliptic spot elongated in the B–D direction, as shown in FIG. 4C. FIG. 4B shows a state wherein the beam is set in an in-focus state.

In the above embodiment, the polarizing beam splitter film 203 formed on the inclined surface of the rectangular prism 102 may also be formed with a half mirror having a distribution ratio of 1 or more.

As has been described above, according to the present invention, a servo signal can be detected well, and a good reproducing signal (RF) signal can be obtained. In addition, the entire optical head can be made compact.

What is claimed is:

1. An optical head apparatus for a phase change disk, comprising:

a semiconductor laser for outputting a laser beam;

a rectangular prism having an inclined surface formed with a polarizing beam splitter to deflect the laser beam emitted from said semiconductor laser by 90° toward an optical disk, said polarizing beam splitter passing therethrough a return beam of the laser beam which is reflected by the optical disk;

diffracted light component generating means, arranged in contact with or close to said inclined surface of said prism, for generating a 0th-order polarized laser beam and ±1st-order polarized laser beams from the beam returning from the optical disk through said rectangular prism;

a first optical sensor for detecting the 0th-order polarized laser beam output from said diffracted light component generating means, a reproducing signal being obtained from an output from said first optical sensor; and a second optical sensor for detecting one of the ±1st-order polarized laser beams output from said diffracted light component generating means, a focusing error signal and a tracking error signal being obtained based on an output from said second optical sensor.

2. An apparatus according to claim 1, further comprising a flat plate member adhered to said inclined surface of said rectangular prism, and wherein said diffracted light component generating means is formed on one of surfaces of said flat plate member on which said inclined surface of said rectangular prism is adhered and not adhered, respectively.

3. An apparatus according to claim 1, wherein said diffracted light component generating means comprises a diffraction grating.

4. An apparatus according to claim 1, wherein said polarizing beam splitter rotates a plane of polarization of the beam returning from the optical disk by 90°.

5. An apparatus according to claim 1, further comprising a capsulation for accommodating said semiconductor laser, said rectangular prism, said diffracted light component generating means, and said first and second optical sensors.

6. An apparatus according to claim 1, further comprising signal detection means for detecting the reproducing signal from the output from said first optical sensor, and signal calculating means for calculating the focusing error signal and the tracking error signal based on the output from said second optical sensor.

7. An apparatus according to claim 1, further comprising a λ/4 plate adhered to an output-side end face of said rectangular prism to convert the beam emitted from said semiconductor laser from a linearly polarized laser beam into a circularly polarized laser beam.

* * * * *